United States Patent
Browning, Jr. et al.

(10) Patent No.: US 11,850,787 B2
(45) Date of Patent: Dec. 26, 2023

(54) INTEGRALLY, EXTRUSION BLOW MOLDED CONTAINER, LABEL AND RFID TAG

(71) Applicant: Silgan Plastics LLC, Chesterfield, MO (US)

(72) Inventors: Kenneth J. Browning, Jr., Lithia Springs, GA (US); Timothy P. Monacella, Braselton, GA (US); Braden Telesz, Sharpsville, PA (US)

(73) Assignee: Silgan Plastics LLC, Chesterfield, MO (US)

( * ) Notice: Subject to any disclaimer, the term of this patent is extended or adjusted under 35 U.S.C. 154(b) by 0 days.

(21) Appl. No.: 17/540,656

(22) Filed: Dec. 2, 2021

(65) Prior Publication Data

US 2022/0088848 A1  Mar. 24, 2022

Related U.S. Application Data

(60) Division of application No. 16/597,387, filed on Oct. 9, 2019, now Pat. No. 11,213,991, which is a
(Continued)

(51) Int. Cl.
*B29C 49/22* (2006.01)
*B65D 23/08* (2006.01)
(Continued)

(52) U.S. Cl.
CPC .............. *B29C 49/22* (2013.01); *B29C 49/04* (2013.01); *B32B 1/02* (2013.01); *B32B 27/08* (2013.01); *B65D 1/0215* (2013.01); *B65D 1/40* (2013.01); *B65D 23/0864* (2013.01); *G09F 3/0335* (2013.01); *B29C 48/0017* (2019.02); *B29C 48/09* (2019.02); *B29C 48/49* (2019.02); *B29C 49/2408* (2013.01); *B29C 2049/2412* (2013.01);
(Continued)

(58) Field of Classification Search
CPC ........................ B65D 23/0864; B65D 23/0842; B65D 23/00; B65D 25/14; B65D 1/0215; B65D 1/0207; B65D 1/02; B65D 1/40; B29K 49/22; B29K 49/04; B29K 49/2408; B29K 2049/2497; B29K 2049/225; B29K 2049/224; B29K 2049/222; B29K 2049/241; B29K 2023/065; B29K 2029/04; B29K 2995/0067; B32B 1/02; B32B 27/08; B32B 2250/02; B32B 2250/04; B32B 2307/7244; B29C 49/22; G09F 3/0335; G09F 3/0329; G06K 19/0723; B29L 2031/7158
USPC ..... 215/386, 400, 12.1, 12.2, 44; 220/62.22, 220/62.12, 62.11; 40/310; 340/12.51, 340/13.26; 428/34.1, 35.7
See application file for complete search history.

(56) References Cited

U.S. PATENT DOCUMENTS 6,117,506 A   9/2000  Graboski et al.
6,147,604 A  11/2000  Wiklof et al.
(Continued)

*Primary Examiner* — Robert J Hicks
(74) *Attorney, Agent, or Firm* — Reinhart Boerner Van Deuren s.c.

(57) ABSTRACT

An improved method for molding a plastic container within a mold including an RFID tag to generate a container which leaves a mold having an RFID tag bonded between the container and a label. This method provides for an improved integrally, extrusion blow molded container, label and RFID tag combination.

10 Claims, 2 Drawing Sheets

Related U.S. Application Data continuation of application No. 15/710,996, filed on Sep. 21, 2017, now Pat. No. 10,479,556.

(51) Int. Cl.
| | |
|---|---|
| *B65D 1/40* | (2006.01) |
| *B65D 1/02* | (2006.01) |
| *B32B 27/08* | (2006.01) |
| *B29C 49/04* | (2006.01) |
| *G09F 3/03* | (2006.01) |
| *B32B 1/02* | (2006.01) |
| *B29C 49/24* | (2006.01) |
| *B29L 31/00* | (2006.01) |
| *B29K 29/00* | (2006.01) |
| *B29K 23/00* | (2006.01) |
| *B29C 48/00* | (2019.01) |
| *B29C 48/09* | (2019.01) |
| *B29C 48/49* | (2019.01) |

(52) U.S. Cl.
CPC ............. *B29C 2049/2449* (2013.01); *B29C 2049/24308* (2022.05); *B29K 2023/065* (2013.01); *B29K 2029/04* (2013.01); *B29K 2995/0067* (2013.01); *B29L 2031/7158* (2013.01); *B32B 2250/02* (2013.01); *B32B 2250/24* (2013.01); *B32B 2307/7244* (2013.01); *B65D 2203/10* (2013.01)

(56) References Cited

U.S. PATENT DOCUMENTS

| | | | |
|---|---|---|---|
| 6,349,974 B1* | 2/2002 | Grosskopf | B65D 23/005 |
| | | | 156/277 |
| 10,479,556 B2 | 11/2019 | Browning, Jr. et al. | |
| 2005/0068182 A1 | 3/2005 | Dunlap et al. | |
| 2005/0128086 A1* | 6/2005 | Brown | G06K 19/07728 |
| | | | 235/491 |
| 2006/0109130 A1* | 5/2006 | Hattick | H01L 24/24 |
| | | | 340/572.7 |
| 2006/0255945 A1* | 11/2006 | Egbert | G06K 19/07749 |
| | | | 340/572.7 |
| 2007/0009732 A1 | 1/2007 | Tsai et al. | |
| 2019/0135501 A1* | 5/2019 | Chandra | G06K 19/07798 |

\* cited by examiner

INTEGRALLY, EXTRUSION BLOW MOLDED CONTAINER, LABEL AND RFID TAG

CROSS-REFERENCE TO RELATED PATENT APPLICATION

This application is a divisional of U.S. application Ser. No. 16/597,387, filed Oct. 9, 2019, which is a continuation of U.S. application Ser. No. 15/710,996, now U.S. Pat. No. 10,479,556, filed on Sep. 21, 2017, which is incorporated herein by reference in its entirety.

FIELD OF THE INVENTION

This invention generally relates to an extrusion-blow-molded plastic container which is having an RFID tag attached to a label prior to molding and then attached to the container between the mold cavity and outside surface of the container during the molding process. More specifically, this invention relates to a container formed from a heated extrusion which is blow-molded after a label having an RFID tag attached thereto is placed in the mold thereby securing the RFID tag between the surface of the container and the inside surface of the label with Heat activated adhesive.

BACKGROUND OF THE INVENTION

The merchants of plastic containers such as beverage bottles and food trays are demanding container identifications which are electronically recognizable for purposes of improving commercial transactions involving such containers. At present, one of the primary such identifications are 1 and 2 dimension barcode marking which generate a light signal requiring a line of sight between the reader and the barcode. In addition, there are some products which include electrical signal generators such as radio frequency identification ("RFID") tags. An advantage of RFID tags is that a line of sight is not required between the tag reader and the tag. Accordingly, tags can be hidden, and still read.

One problem with RFID tags is that, unlike barcodes, they have structure (e.g. antenna, circuitry, substrate) which requires handling and support relative to a container which is much more complicated than just printing a barcode on a container label or directly onto a container. Additionally, plastic containers are thermally formed, or thermally processed after filling. The temperatures at which these thermal processes are carried out will often destroy the signal generating functionality of a typical RFID tag.

The invention provides a method for molding a plastic container within a mold including an RFID tag to generate a container which leaves a mold having an RFID tag bonded between the container and a label. The invention also provides for an integrally, extrusion blow molded container, label and RFID tag combination.

BRIEF SUMMARY OF THE INVENTION

One embodiment of the present invention provides a method for forming a plastic container which is attached to an electrical signal generator during and extrusion blow molding process. The method includes a mold having at least two portions which are moveable between open and closed positions, wherein when the portions are in the closed position the mold defines an interior surface. The method further includes attaching an electrical signal generator to a container label, locating the label and electrical signal generator in the mold when the portions are in the open position, extruding a heated parison, closing the mold; and pressurizing the parison to expand the parison into contact with the generator, the label and the interior surface to form an outside surface of the combination of the container, label and generator which has a shape generated by the shape of the interior surface.

Another embodiment of the present invention provides a combination of a heated mold and a plastic container. The combination includes the heated mold, a label and an electrical signal generator, compliable with the interior surface of the mold and located adjacent and located between the container and the label. The container is a parison under pressure and expanded to force the container into contact with the generator, label and interior surface to reshape the parison into a plastic container having a combined shape generated by the internal shape of the mold. For most beverage containers this shape includes at least a threaded neck and a vessel portion. Of course, for a food tray, the shape would not typically include a threaded neck.

Another embodiment of the present invention provides for a container injection blow molded with an electric generator bonded between the plastic container and a label with a heat activated adhesive which is activate during the blow molding process.

In other embodiments of the present invention, the label may also include light generating identifiers such as barcodes, the plastic containers may be multi-layer containers having multiple layers of plastic differing in types, the mold may be actively heated and/or cooled, the parison heated to a temperature which facilitates the air-pressure expansion of the parison, and the RFID tag includes a heat protective enclosure such as 2 thermally protective sheets of material such as a thermoplastic or ceramic material. Typically the mold would be a two piece mold, but some embodiments may require more complex multi-piece molds. Additionally, the handling of labels will typically require pick-and-place vacuum cup robotic equipment designed to place the labels and tags within an open mold prior to extrusion of the respective parison.

DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
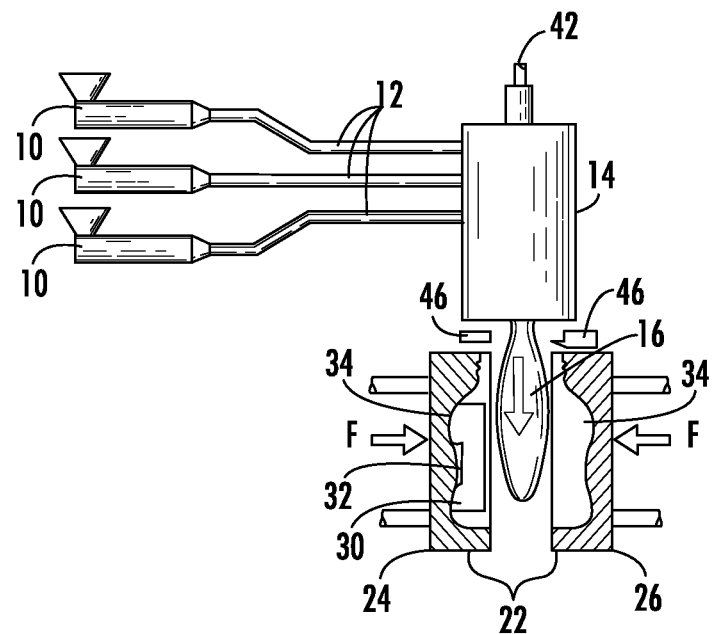
FIG. 1 is a schematic view of a portion of an extrusion blow molding apparatus used implement embodiments of the present invention and to form embodiments of the container/bottle of present invention.
Figure 2:
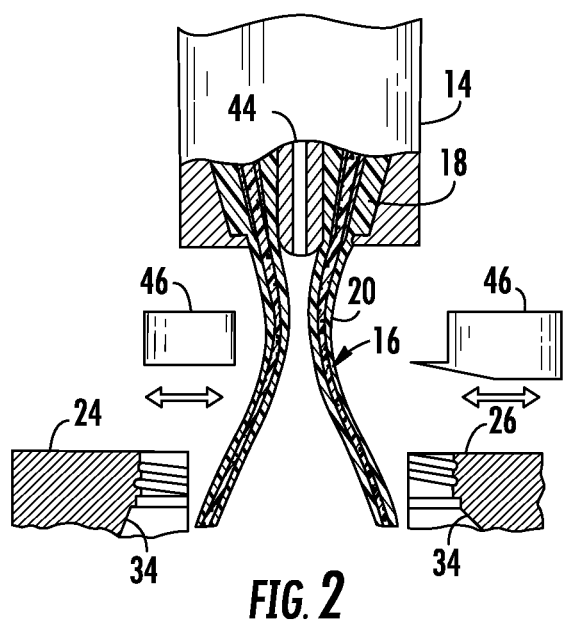
FIG. 2 is an enlarged, detailed, partial section view from FIG. 1.
Figure 3:
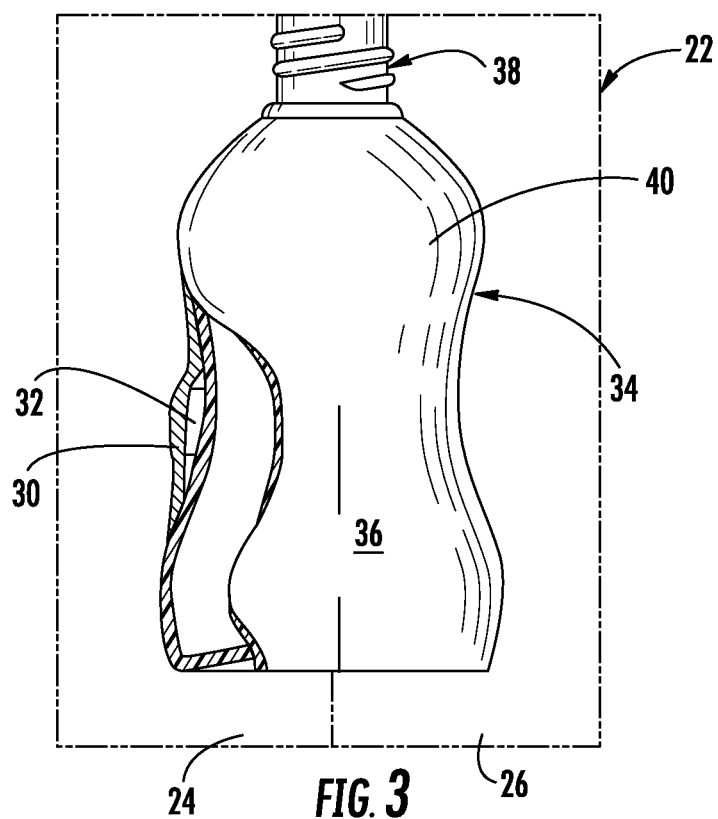
FIG. 3 is a schematic view of a 2 piece mold, a mold head through which air is forced to inflate a parison.

Referring to FIGS. 1-3, a schematic representation of an injection molding system and portions thereof are illustrated. The system includes three separate extruders 10 each generating a stream of flowable plastic which passes through the conduits 12 into the die block 14. (For purposes of this disclosure, "plastic" means a thermoplastic unless reference is specifically made to a thermal-set-plastic i.e. a type of plastic which is cross-linked during heating/molding.) The streams may be of the same or different plastics, and the number of streams and conduits may range from 1 to the number of layers which meet the technical requirements for a particular container. By way of example, there are some containers that include 2 plastic layers or more. In particular, they may have an interior layer and an exterior layer bonded together by an adhesive layer there between. For this configuration one of the extruders 10 would have the plastic material for the interior layer EVOH/HDPE or PP, the second would have the Adhesive Resin or HDPE if no Barrier Resin is required for the inner layer, and the third would have the plastic material for the outside layer. In many cases the adhesive may be a plastic having characteristics which allow the adhesive to bond to different plastics which would not effectively bond to each other for purpose of forming a container.

The extruders 10 heat the pellets for the respective plastics to a flowable temperature using mechanical action, and the die block 14 is heated to maintain the appropriate temperature to create a parison 16. In particular, referring to FIG. 2, the composite stream is extruded through an annular orifice 18 of block 14 to form a tubular multilayer stream 20 of plastic to form parison 16.

Referring to FIGS. 1-3, mold 22 includes mold portions 24 and 26. While parison 16 is being formed, the mold portions 24 and 26 are in an open position. While in the open position, a robotic label handler (not shown) places a label 30 including an electronic signal generator such as an RFID tag 32 into the mold 22 as shown in FIG. 1. In the present embodiment the label handler would include a vacuum cup which would be activated to pick individual labels 30 from a stack of labels and then place and orient the labels into the open mold 22.

Upon completion of the creation of parison 16, and placement of label 30 and tag 32, mold portions 24 and 26 are forced together using a force F shown in FIG. 1. The joined mold portions 24 and 26 form an interior surface 34 which has a shape which generates the shape of a container 36. In general, a bottle-type container will include a threaded neck portion 38 and a vessel portion 40. Referring to both FIGS. 1 and 2, gas (typically air) is injected into port 42 which communicates with port 44 which resides within parison 16. The gas is injected after mold 22 is closed to expand the parison 16 to force it into contact with the tag 32, the label 30 and the interior surface 34 to form an outside surface of the combination of the resulting container 36, label 30 and tag 32 which has a shape generated by the shape of the interior surface 34.

Referring again to port 44, as shown in FIG. 2, port 44 cooperates with orifice 18 to form the multilayer stream 20.

Upon completion of the pressurization and molding of the container 36, cutting blocks 46 are moved as shown in FIG. 2 to sever the multilayer stream 20 from the container 36, the mold 22 is opened and the container 36 is ejected from the mold 22. The resulting container 36 includes tag 32 fixed between label 30 and the outside surface of container 36. Depending upon the opacity of the container 36, container content and label 30, tag 32 may not be viewable by a viewer of container 36. For some consumer products it is desirable to "hide" RFID labels.

Referring now in more detail to RFID tag 32, one embodiment of the tag would include an antenna coupled to an integrated circuit ("chip") with the antenna and chip being supported by a flexible substrate such as an appropriate ceramic or thermos-set plastic sheet. To provide additional thermal protection for the antenna and circuit, a second sheet of appropriate ceramic or thermos-set plastic would be joined to the first sheet at the perimeters thereof to envelop or enclose the antenna and circuit to provide a thermally protected tag assembly flexible enough to comply with the shape of interior surface 34.

Depending upon the application, it may be desirable to bond tag 32 to the container 36 and/or label 30. This can be accomplished with an appropriate adhesive. In one embodiment, such an adhesive would be a heat activatable adhesive which is activated to provide the desired bond using the heat/temperature provided during the blow molding process.

Figure 4:
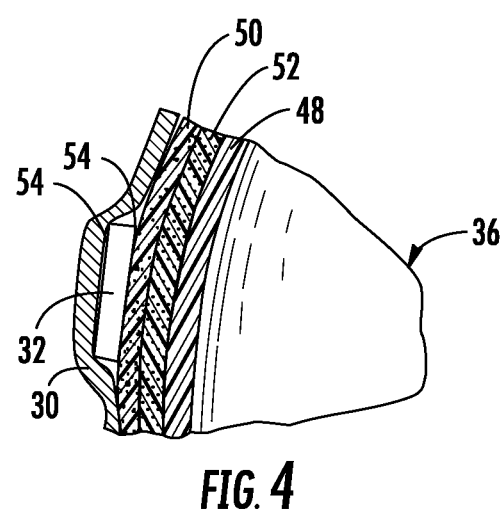
FIG. 4 is an enlarged sectional view of the container wall, label and RFID tag.

Referring to FIG. 4, a sectional view of the molded bottle illustrates the orientation of the interior bottle layer 48, the exterior bottle layer 50, the adhesive/plastic layer 52 which bonds the layer 48 to 50. Also illustrated are label 30 and tag 32, and thermally activated adhesive layers 54 which bond the tag 32 to the label 30 and outer surface of container 36.

Examples of plastic resins which would be used to create the layers of multilayer stream 20 include: Generic HDPE, Adhesive, EVOH & PP resins.

Examples of adhesives/plastics which are compatible with and adhere to dissimilar plastic layers include: Plexar Adhesive 3236 which bonds dissimilar resins together Example HDPE, EVOH, PP.

Examples of heat activatable adhesives useable with tags such as RFID tags and label materials such as Yupo films include: Plexar Adhesive 3236.

Typical temperature ranges for parison formation include: 380F-420F.

Typical temperature ranges at which the molds are operated include: 45F-60F.

In one embodiment, the tag 32 would be required to reliably generate signals after being heated to at least 420F.

In various typical embodiments, container 36 is a plastic. In one preferred embodiment, container 36 is formed from extruded high density polyethylene (HDPE) having an average wall thickness of about 1.0 millimeter. In other embodiments, container 36 may be formed from any extrudable blow-molded material, such as Polypropylene (PP), nylon, Polyvinyl Chloride (PVC), and Polyethylene Terephthalate (PET), and having an average wall thickness of 0.6 to 2.0 millimeters. Depending upon the material to be contained in container 36, container 36 may be multilayered with the layers being a combination of one or more of these materials and adhesive layers as dictated by material compatibility.

In various embodiments, container 36 may have an effective internal volume dictated by the size limits of a particular extrusion and blow molding system. For example, sizes of between 0.1 gallons to 5 gallons are common, but preferably between about 0.5 gallon and 2.5 gallons. By "effective internal volume" it is meant the nominal storage capacity of a liquid within container 36 to a fill line that is below the bottle neck opening 38.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A multi-layered plastic container comprising:
   a neck comprising external threads and an orifice extending through the neck and external threads;
   a vessel comprising an inner layer and an outer layer, wherein the inner layer and outer layer are coupled together with a heat activated adhesive;
   a label comprising an electronic signal generator; and
   an RFID tag comprising two or more thermally protective sheets and located within the label, wherein the label is located between the inner layer and outer layer of the vessel.

2. The plastic container of claim 1, wherein the protective sheets comprise a thermoset or a ceramic material.

3. The plastic container of claim 1, wherein the RFID tag is operable and generates signals when heated to at least 420° F.

4. The plastic container of claim 1, further comprising a light generating identifier.

5. The plastic container of claim 1, further comprising a barrier layer between the inner layer and the outer layer of the vessel.

6. The plastic container of claim 1, wherein the tag is bound to a barrier layer between the inner and outer layer of the vessel with an adhesive.

7. The plastic container of claim 6, wherein the adhesive is a heat activated adhesive that generates adhesive properties when a temperature of the adhesive rises during a blow molding process.

8. The plastic container of claim 1, further comprising a barrier layer located between the inner layer and outer layer of the vessel, the barrier layer forming a bond between the inner layer and the outer layer.

9. The plastic container of claim 8, wherein the barrier layer comprises at least one of EVOH, high density polyethylene HDPE, polyvinyl chloride PVC, polyethylene terephthalate PET, or polypropylene PP.

10. The plastic container of claim 9, wherein the barrier layer comprises Plexar Adhesive 3236.

* * * * *